(12) United States Patent
Busch

(10) Patent No.: US 6,619,027 B1
(45) Date of Patent: Sep. 16, 2003

(54) GAS TURBINE HAVING ROTOR OVERSPEED AND OVERBOOST PROTECTION

(75) Inventor: Thomas George Busch, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 84 days.

(21) Appl. No.: 09/687,325

(22) Filed: Oct. 13, 2000

(51) Int. Cl.[7] .................................................. F02C 9/28
(52) U.S. Cl. ...................................................... 60/39.281
(58) Field of Search ............................ 60/39.281, 773, 60/779

(56) References Cited

U.S. PATENT DOCUMENTS

| | | | |
|---|---|---|---|
| 2,986,126 A | * | 5/1961 | Werts ....................... 60/39.281 |
| 3,050,941 A | * | 8/1962 | Rogers ..................... 60/39.281 |
| 3,488,946 A | | 1/1970 | Jubb et al. |
| 3,808,801 A | * | 5/1974 | Taylor ...................... 60/39.281 |
| 4,578,945 A | | 4/1986 | Peck et al. |
| 4,602,479 A | * | 7/1986 | Hansen ..................... 60/39.281 |
| 4,716,723 A | * | 1/1988 | Ralston et al. ........... 60/39.281 |
| 4,817,376 A | | 4/1989 | Brocard et al. |
| 4,835,969 A | | 6/1989 | Tallman |
| 4,993,221 A | | 2/1991 | Idelchik |
| 5,042,247 A | | 8/1991 | Moore |
| 5,058,373 A | | 10/1991 | Moore |
| 5,069,030 A | | 12/1991 | Moore |
| 5,099,643 A | | 3/1992 | Moore |
| 5,199,256 A | | 4/1993 | Moore |
| 5,235,806 A | | 8/1993 | Pickard |
| 5,301,499 A | | 4/1994 | Kure-Jensen et al. |
| 5,394,689 A | | 3/1995 | D'Onofrio |
| 5,486,997 A | | 1/1996 | Reismiller et al. |

FOREIGN PATENT DOCUMENTS

| | | |
|---|---|---|
| DE | 195 45 987 A1 | 12/1995 |
| WO | DE99/03350 | 4/2000 |

\* cited by examiner

*Primary Examiner*—Michael Koczo
(74) *Attorney, Agent, or Firm*—Nathan D. Herkamp; Armstrong Teasdale LLP; Robert B. Reeser, III

(57) ABSTRACT

A rotor overspeed protection system for a gas turbine engine controls engine fuel flow to prevent an engine rotor from over-speeding. The engine fuel metering system includes a fuel metering valve in flow communication with a fuel shutoff valve and a fuel bypass valve. The rotor protection system includes an overboost servovalve and a soleniod valve coupled to the fuel metering system and to an independent speed sensing system. In operation, servovalve can control the metered fuel flow to engine independently of the fuel metering valve to facilitate reducing rotor overspeeds and overboosts.

8 Claims, 2 Drawing Sheets

GAS TURBINE HAVING ROTOR OVERSPEED AND OVERBOOST PROTECTION

BACKGROUND OF THE INVENTION

This invention relates generally to gas turbine engine rotors and, more particularly, to rotor protection systems to prevent a rotor over-speed condition.

Gas turbine engines typically include over-speed protection systems that provide rotor over-speed protection. Typically the over-speed protection systems either maintain rotor speed below critical rotor speeds or shut off fuel flow to an engine combustor. One type of known protection system receives signals indicative of rotor speed from mechanical speed sensors. The mechanical speed sensors include rotating flyweight sensing systems that indicate an over-speed condition as a result of the rotor rotating above the normal operational maximum speeds, yet below the structural failure limits. The flyweight sensing systems are hydro-mechanically coupled to a fuel bypass valve, and the fuel bypass valve reduces an amount of fuel that can be supplied to the engine if an overspeed condition is sensed.

Other types of known over-speed protection systems receive over-speed signal information from electronic control sensors. Known electronic controls derive over-speed conditions from such electronic control sensors. Such systems provide for rapid fuel shutoff and resulting engine shutdown if engine speed exceeds a normal maximum value.

BRIEF SUMMARY OF THE INVENTION

In an exemplary embodiment, a gas turbine engine includes a rotor overspeed protection system to prevent the engine rotor from operating at a speed greater than a pre-set operational maximum speed. The engine rotor protection system is coupled to a fuel metering system that supplies fuel to the engine. The fuel metering system includes a fuel metering valve in flow communication with a fuel shutoff valve and a fuel bypass valve. The rotor protection system includes an overboost servovalve and a soleniod valve, and is coupled to an independent speed sensing system. The overboost servovalve includes a plurality of fuel ports.

In operation, when the independent sensing system senses a rotor overspeed condition, a signal is transmitted to the servovalve. The servovalve opens the flow ports in response to the overspeed signal to modify a control pressure signal from the fuel metering valve to the fuel bypass valve. Furthermore, as the servovalve is opened, a portion of fuel flowing to the fuel metering valve is diverted through the fuel bypass valve prior to entering the fuel metering valve. The fuel bypass valve is controlled in response to changes in fuel pressure created by flow through the servovalve; as the fuel bypass valve is opened, less fuel flows through the fuel metering valve. Thus, the servovalve controls the metered fuel flow to the engine independently of the fuel metering valve, and thus, facilitates reducing instances when the rotor operates at a speed greater than a pre-set operational maximum speed, known as an overspeed, or is accelerated with a boost greater than a pre-set operational maximum boost, known as an overboost. Furthermore, the servovalve can be used to shut the fuel shutoff valve, thus stopping fuel flow to the engine.

DETAILED DESCRIPTION OF THE INVENTION

Figure 1:
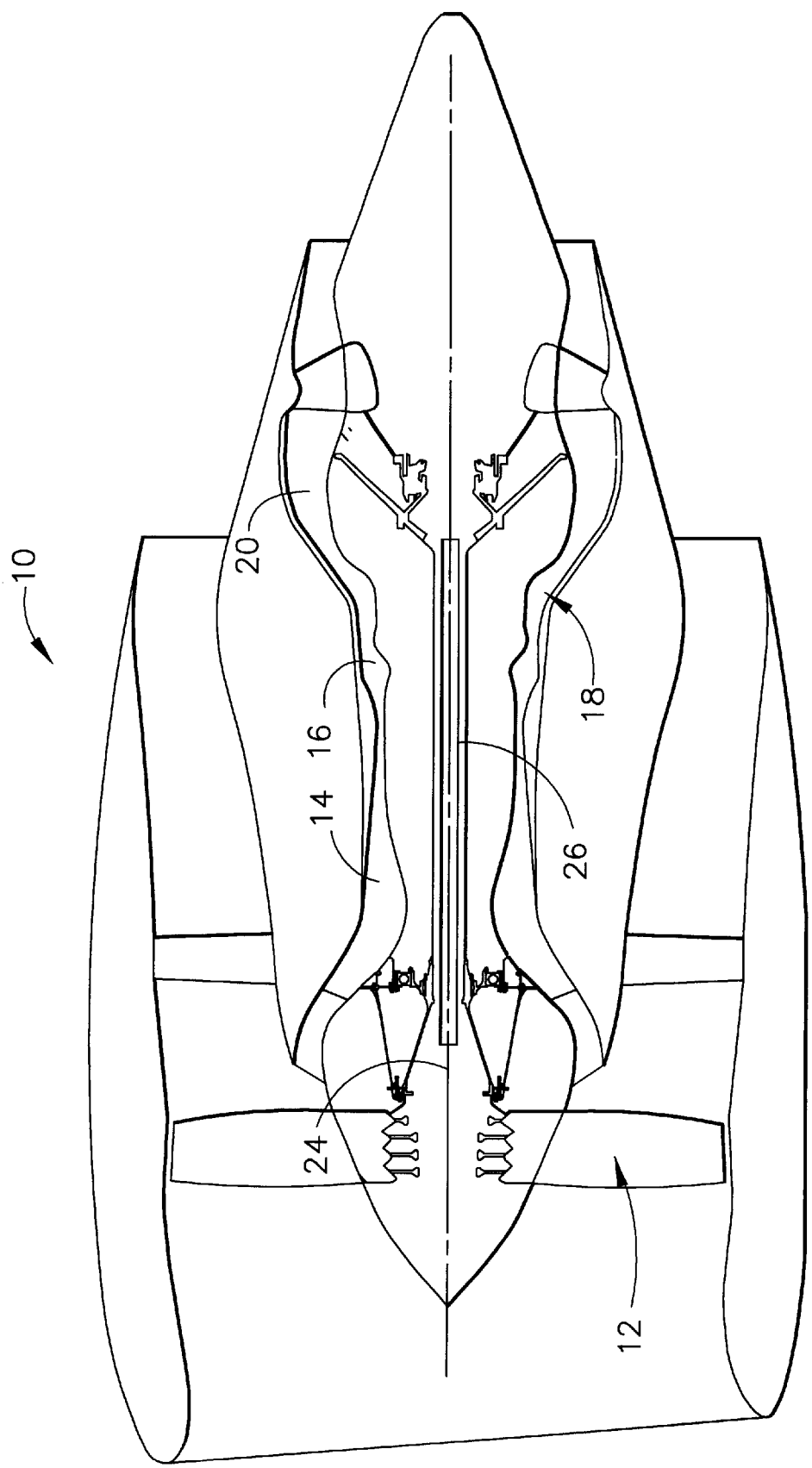
FIG. 1 is a schematic illustration of a gas turbine engine.

FIG. 1 is a schematic illustration of a gas turbine engine 10 including a low pressure compressor 12, a high pressure compressor 14, and a combustor 16. Engine 10 also includes a high pressure turbine 18, and a low pressure turbine 20. Compressor 12 and turbine 20 are coupled by a first rotor shaft 24, and compressor 14 and turbine 18 are coupled by a second rotor shaft 26. In one embodiment, engine 10 is a GE90 engine available from General Electric Aircraft Engines, Cincinnati, Ohio.

In operation, air flows through low pressure compressor 12 and compressed air is supplied from low pressure compressor 12 to high pressure compressor 14. Compressed air is then delivered to combustor 16 and airflow from combustor 16 drives turbines 18 and 20.

Figure 2:
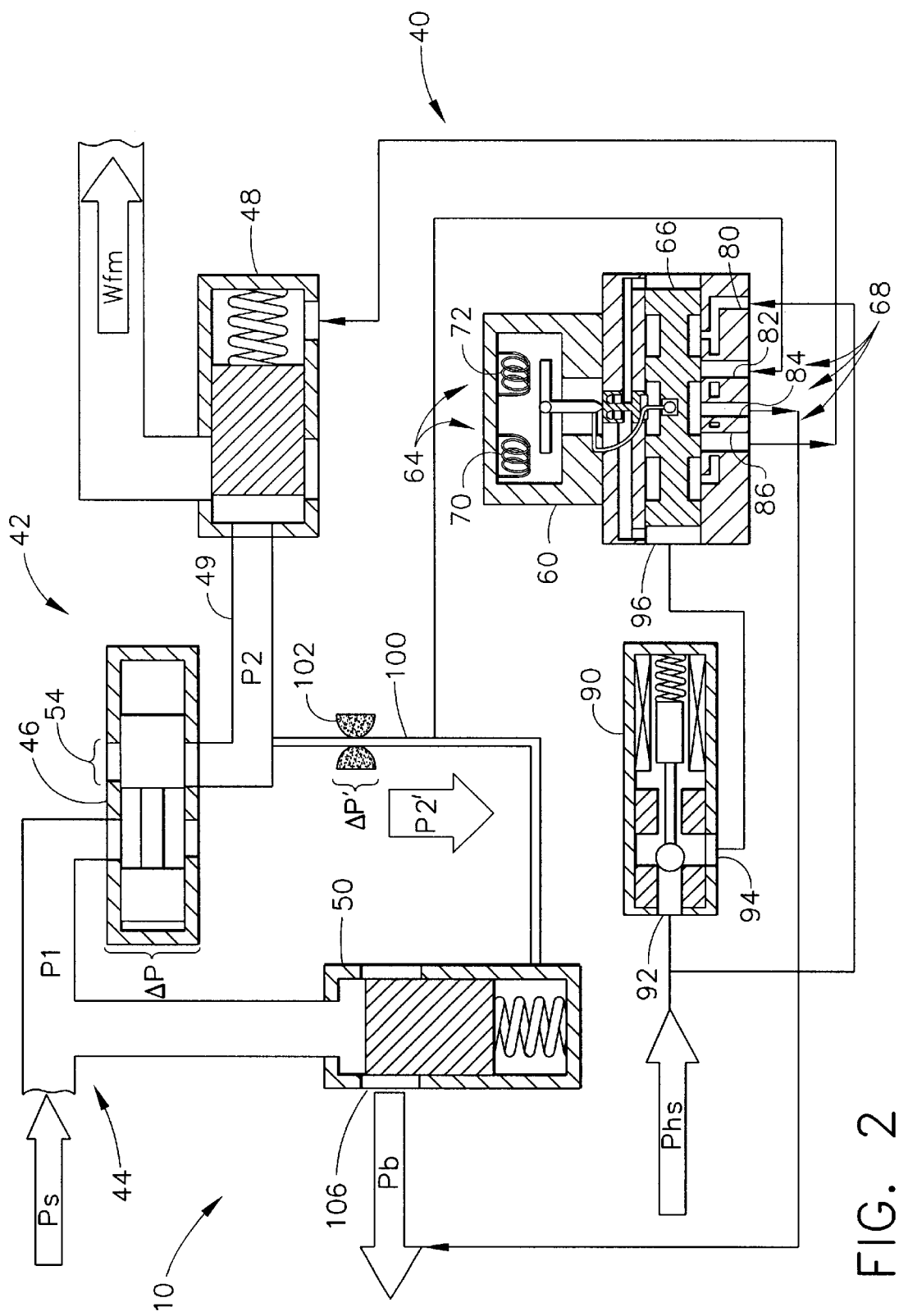
FIG. 2 is a schematic illustration of the engine shown in FIG. 1 including a rotor overspeed protection system.

FIG. 2 is a schematic illustration of engine 10 including a rotor overspeed protection system 40. Engine 10 also includes a fuel metering system 42 in flow communication with a fuel delivery system 44. Fuel metering system 42 includes a fuel metering valve 46, a fuel shutoff valve 48, and a fuel bypass valve 50. Fuel delivery system 44 supplies fuel to engine 10 through fuel metering system 42 which controls a flow of fuel to engine 10. Fuel metering valve 46, fuel shutoff valve 48, and fuel bypass valve 50 are known in the art.

Fuel is supplied to fuel metering valve 46 at a first pressure, $P_1$, and exits fuel metering valve 46 through a fuel line 49 at a second pressure, $P_2$. Fuel line 49 extends between fuel metering valve 46 and fuel shutoff valve 48. Fuel metering system 42 controls a flow Wfm of fuel to engine 10 by regulating a flow area 54 within fuel metering valve 46 while simultaneously maintaining a constant differential pressure $\Delta P$ across flow area 54. Differential pressure $\Delta P$ is calculated as the difference between first pressure $P_1$ and second pressure $P_2$. More specifically, fuel bypass valve 50 is coupled to fuel metering valve 46 to operate to maintain differential pressure $\Delta P$ across fuel metering valve flow area 54 at a pre-determined value.

Fuel shutoff valve 48 is downstream from fuel metering valve 46 and receives fuel flow from fuel metering valve 46 at second pressure $P_2$. In one embodiment, fuel shutoff valve 48 is a pressurizing shutoff valve.

Rotor overspeed protection system 40 prevents engine rotors, such as turbines 18 and 20 (shown in FIG. 1), from operating at a speed greater than a pre-set operational maximum speed, known as an overspeed, or from being accelerated with a boost greater than a pre-set operational maximum boost, known as an overboost, when an engine independent speed sensing system (not shown) determines normal engine operating limits have been exceeded. Independent speed sensing systems are known in the art.

Rotor overspeed protection system 40 includes an overspeed/overboost servovalve 60 coupled to fuel metering system 42 to provide an independent and secondary means of controlling fuel flow to engine 10 if fuel metering valve 46 becomes inoperable. Servovalve 60 is coupled to the independent sensing system and receives electrical overspeed indications from the independent sensing system.

Servovalve 60 includes at least one pair of electrical coils 64, a piston 66, and a plurality of flow ports 68. Coils 64 include a primary coil 70 and a redundant coil 72, and provide positioning signals of varying strengths to piston 66.

Piston 66 moves between various stroke positions in response to the electronic signals and in proportion to the strength of the electric signals transmitted by coils 64. The movement of piston 66 determines which servovalve flow ports 68 are opened. Servovalve flow ports 68 include a first flow port 80, a second flow port 82, a third flow port 84, and a fourth flow port 86. Fourth flow port 86 is coupled to fuel shutoff valve 48.

A shutoff solenoid valve 90 is coupled to servovalve 60 and receives and discharges fuel at a pressure $P_{hs}$ that is equal to or greater than first and second pressures $P_1$ and $P_2$, respectively. Shutoff solenoid valve 90 includes an inlet 92 and at least one discharge flow port 94 that is connected to servovalve 60 for discharging fuel at pressure $P_{hs}$ to an inlet 96 of servovalve 60 providing a second means for controlling movement of servovalve piston 66. In an alternative embodiment, solenoid valve inlet 92 is connected to pressurizing fuel shutoff valve 48. Servovalve first flow port 80 is coupled to a fuel supply source (not shown) to receive fuel at a high pressure $P_{hs}$.

A fuel line 100 connects to fuel line 49 downstream from fuel metering valve 46, and extends from fuel line 49 to fuel bypass valve 50. Fuel line 100 includes a fixed restricting orifice 102 and delivers fuel at a pressure $P_{2'}$ to fuel bypass valve 50. Servovalve second flow port 82 is coupled to fuel line 100 downstream of fixed restricting orifice 102.

Fuel bypass valve 50 includes a fuel port 106 that permits fuel to dump to a low pressure drain (not shown) at a pressure $P_b$. Servovalve third flow port 84 is coupled to the low pressure drain.

During operation, the engine independent sensing system senses rotor overspeed conditions and transmits an electric signal to servovalve 60. More specifically, the electric overspeed signal is transmitted to servovalve coils 64 which serve to translate servovalve piston 66. Servovalve piston 66 moves away from servovalve inlet 96 in proportion to the electric signal transmitted by servovalve coils 64.

As piston 66 translates, servovalve second flow port 82 is opened, such that fuel flowing within fuel line 49 from fuel metering valve 46 is directed through fuel line 100 and through fixed restricting orifice 102 to flowport 82 and out flowport 84 to the low pressure drain. As servovalve piston 66 moves a farther distance from servovalve inlet 96, an amount of fuel flowing in fuel line 100 increases and causes a pressure drop $\Delta P'$ across fixed restricting orifice 102 to also increase. As a result of the increased pressure drop $\Delta P'$ across fixed restricting orifice 102, fuel pressure $P_{2'}$ decreases to a value less than that of fuel pressure $P_2$, which in turn causes differential pressure $\Delta P'$ across fixed restricting orifice 102 to drop below differential pressure $\Delta P$.

Because fuel bypass valve 50 responds to changes in fuel pressure $P_{2'}$, a pressure drop $\Delta P$ across fuel metering valve flow area 54 is less than before the movement of servovalve piston 66. As a result, less fuel flows across fuel metering valve flow area 54. Thus, servovalve 66 can control the metered fuel flow to engine 10 independently of fuel metering valve 46 to facilitate a reduction in rotor overspeeds and overboosts. Furthermore, the combination of the independent sensing system and servovalve 66 not only permits the engine speed to be limited to a speed below that required for structural integrity, but also permits the engine speed to be trimmed to within a normal engine speed operating range that is less challenging to an integrated aircraft flight control system.

If the independent sensing system continues to sense a rotor overspeed, a maximum value electrical signal is transmitted to servovalve coils 64 and piston 66 moves in proportion to the maximum value electrical signal to isolate servovalve fourth flow port 86 from the low pressure drain. As piston 66 moves, flow port 86 is disconnected from flow port 84 and the low pressure drain, and is then opened to receive fuel at high pressure $P_{hs}$ entering servovalve 66 through flow port 80. Connecting flow port 86 to high pressure $P_{hs}$ results in closing fuel shutoff valve 48 to stop fuel flow to engine 10.

Fuel shutoff solenoid 90 provides a secondary means to effect engine shutdown. When energized, fuel shutoff solenoid valve 90 supplies high pressure fuel $P_{hs}$ to servovalve 60 to maintain piston 66 in a full stroked position, thus causing fuel shutoff valve 48 to close and stop fuel flow to engine 10. In an alternative embodiment, fuel solenoid valve 90 supplies high pressure fuel $P_{hs}$ directly to shutoff valve 48 to stop fuel flow to engine 10.

The above-described rotor overspeed protection system is cost-effective and highly accurate. The overspeed protection system controls engine fuel flow independently of the fuel metering valve. The combination of the overspeed protection system and the independent speed sensing permits the engine speed to not only be limited to a speed below that required for structural integrity, but also permits the engine speed to be trimmed to within a normal engine speed operating range in a manner that facilitates reducing overboosting and overspeeding of the rotor. As a result, the rotor overspeed protection system prevents rotor over-speeds in a cost-effective and reliable manner.

While the invention has been described in terms of various specific embodiments, those skilled in the art will recognize that the invention can be practiced with modification within the spirit and scope of the claims.

What is claimed is:

1. A rotor overspeed protection system for a gas turbine engine, the engine including an independent speed sensing system providing an indication of rotor speed to the rotor overspeed protection system, said rotor overspeed protection system comprising:

a fuel metering system comprising a fuel metering valve, a fuel shutoff valve, and a fuel bypass valve coupled in flow communication; and a servovalve in flow communication with said fuel metering valve for receiving a signal indicative of rotor speed from the independent speed sensing system and operable to divert fuel from said fuel metering valve through said servovalve to control rotor speed when a rotor overspeed condition is sensed by the independent speed sensing system, said servovalve is further configured for diverting a portion of fuel flowing from said fuel metering valve to a low pressure drain in flow communication with said fuel bypass valve.

2. A rotor overspeed protection system in accordance with claim 1 wherein said servovalve is further configured for diverting a portion of fuel flowing from said fuel metering valve through a restricting orifice to a low pressure drain such that additional fuel is diverted through said fuel bypass valve.

3. A rotor overspeed protection system in accordance with claim 1 wherein said servovalve is further configured for controlling metered fuel flow to the engine independently of said fuel metering valve.

4. A rotor overspeed protection system in accordance with claim 1 further comprising a shutoff solenoid valve coupled to said servovalve and configured for stopping fuel flow to the engine.

5. A gas turbine engine comprising:

a fuel metering system comprising a fuel metering valve and a fuel bypass valve in flow communication with said fuel metering valve, said fuel metering system configured to supply fuel to said engine;

a servovalve coupled to said fuel metering system for controlling a pressure drop at said fuel metering valve such that operation of said fuel bypass valve controls fuel flow to said engine based on said pressure drop; and a restricting orifice coupled to said servovalve in flow communication with said fuel metering valve, said servovalve is further configured for diverting a portion of fuel flow exiting said fuel metering valve to a low pressure drain coupled in flow communication with said fuel metering system.

6. A gas turbine engine in accordance with claim 5 wherein said servovalve is further configured for controlling fuel flow to said engine independently of said fuel metering system.

7. A gas turbine engine in accordance with claim 5 further comprising a shutoff solenoid valve coupled to said servovalve and configured for stopping fuel flow to said engine.

8. A gas turbine engine in accordance with claim 5 wherein said servovalve is further configured to meter fuel flow to said gas turbine engine by diverting a portion of fuel flow exiting said fuel metering valve through said restricting orifice to said low pressure drain such that additional fuel is diverted through said fuel bypass valve.

* * * * *